O. R. BRIGGS.
ATTACHMENT FOR ICE CREAM FREEZERS.
APPLICATION FILED NOV. 19, 1907.
900,657.
Patented Oct. 6, 1908.
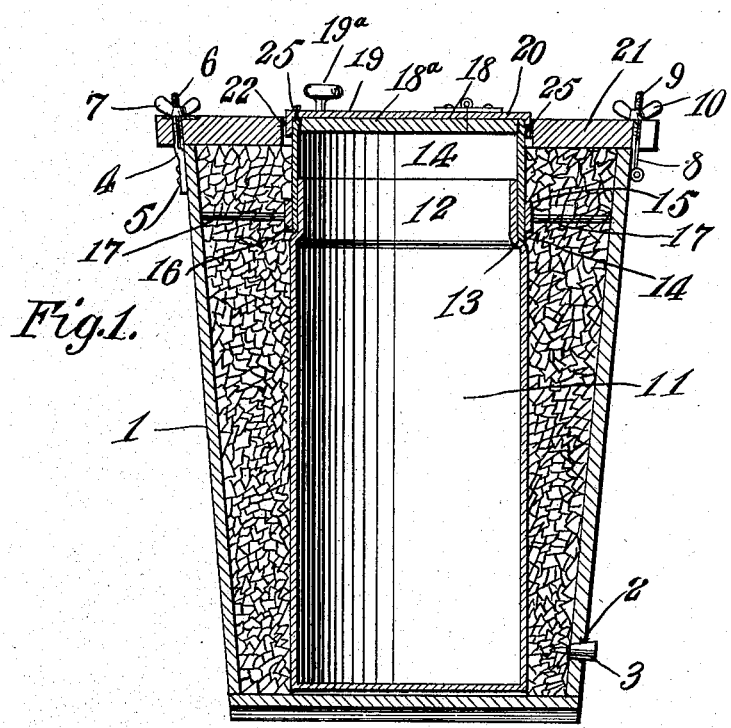
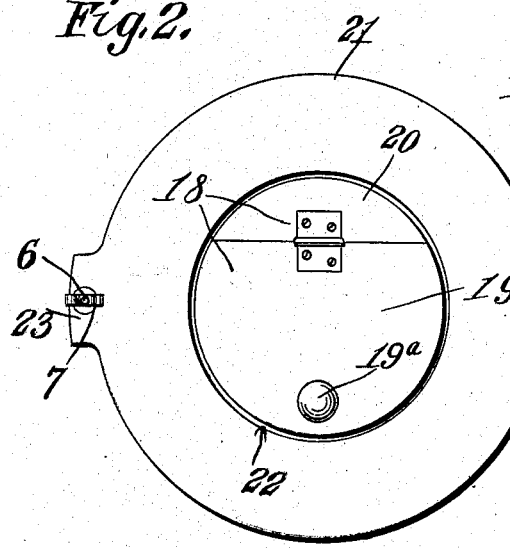
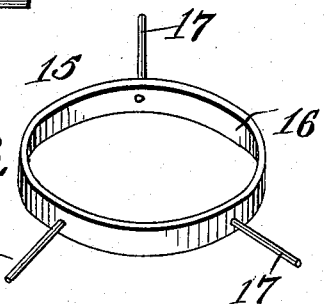
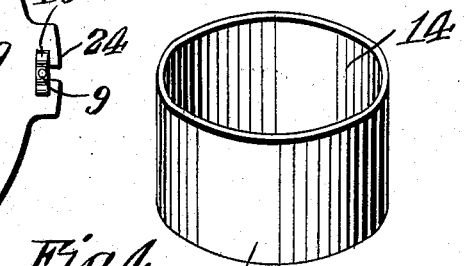
Inventor
Otis R. Briggs.
Witnesses
By Victor J. Evans
Attorney

UNITED STATES PATENT OFFICE.

OTIS R. BRIGGS, OF COLBY, WISCONSIN.

ATTACHMENT FOR ICE-CREAM FREEZERS.

No. 900,657.  Specification of Letters Patent.  Patented Oct. 6, 1908.

Application filed November 19, 1907. Serial No. 402,893.

*To all whom it may concern:*

Be it known that I, OTIS R. BRIGGS, a citizen of the United States, residing at Colby, in the county of Clark and State of Wisconsin, have invented new and useful Improvements in Attachments for Ice-Cream Freezers, of which the following is a specification.

This invention relates to improvements in attachments for ice cream freezing and shipping tubs, and the object of the invention is to provide novel devices whereby cream frozen in the ordinary manner may be dispensed without removing the freezing can from the tub or interfering with the ice within the tub, and whereby cream packed for shipment in the ordinary packing tubs may be dispensed without removing the can from the tub.

With these and other ends in view the invention resides in the novel construction and arrangement of devices hereinafter fully described and claimed.

In the drawing, Figure 1 is a central vertical section of a freezing or shipping tub with my improvements secured in position upon a freezing can within the tub. Fig. 2 is a top plan view of the same. Fig. 3 is a perspective view of the extension collar, and Fig. 4 is a perspective view of the can support.

In carrying out my invention, cream is frozen in the ordinary manner, within a freezing can incased within an ordinary tub, broken ice being packed between the freezing can and tub, means being provided for rotating the can around the broken ice until the freezing process is completed. When the cream is thoroughly frozen the cap supporting the dasher and other mechanism is removed from the can and a cover of an ordinary construction is placed over the mouth of the can and ice and brine thoroughly packed around the can. In dispensing the cream from the can, the cap is of course removed and frequently ice and brine enter the interior of the freezing can and penetrating the cream within the can pollute and render it unsalable. It will be noted that when the cover supporting the dasher is removed from the freezing can, a considerable space is left between the can and the top of the tub, and as it is desirable in carrying out the present invention to build up this space, a suitable extension and apparatus for properly supporting the extension is provided. A closure is provided upon the extension, which is easily operated to provide free access to the cream within the can and which eliminates all danger of salty ice falling within the can and provides a greater space for the packing of ice around the can.

In the drawing the numeral 1 designates a freezing or shipping tub of the ordinary construction and provided with the usual outlet opening 2 and plug 3. At the mouth of the tub 1, I provide an upwardly projecting bolt 4, securely attached to the tub by screws 5, or other suitable retaining elements. The projecting portion of the bolt is suitably threaded as at 6, and adapted for the reception of a winged nut 7. Diametrically opposite the bolt 4, the tub 1 is provided with a hinged bolt 8, having a threaded portion 9 and adapted to receive a winged retaining nut 10.

Centrally located within the tub is a freezing can 11 of the usual construction and having a shoulder or bead 13 for the reception of the usual form of cover and freezing apparatus generally employed.

An extension collar 14, of a size adapted to fit snugly upon the can 11 and to rest upon the shoulder 13 of the can, is provided to bring the can to a level with a closure 21, provided upon the tub 1.

In order to keep the can 11 and the collar 14 in proper vertical position within the tub 1, and to obviate any liability of tilting or other movement of the can and collar, I provide a can support 15 comprising a cylindrical band or collar 16 and a plurality of prongs or fingers 17. The fingers 17 of the support are adapted to contact with the inner wall of the tub, while the band or collar 16 securely engages with the extension collar 14, and presses it tightly against the mouth of the freezing can.

A suitable cover 18, having a lining of asbestos or other suitable heat excluding material 18[a], and comprising a hinged door portion 19, having a handle 19[a], and a stationary portion 20, is provided for the mouth of the collar or extension 14, while a suitable closure 21 is provided for the tub 1.

The closure 21 is provided with a central recess 22, and with ears 23 and a slotted enlargement 24, adapted to be securely retained upon the mouth of the tub 1 by the bolts 4 and 8 of the retaining elements 7 and 10.

Binding screws 25 are employed for retaining the closure 18 upon the extension collar 14, and when the cream is to be served it is simply necessary to loosen these screws 25, when the cover may be swung open and access to the cream may be had.

While thus far I have described my invention in connection with a freezing tub, it will be understood that the device may also be used with great efficiency upon packing tubs, when the cream is to be shipped, and that free access to the cream within the can within the packing tub may be had, in the manner previously described, without removing the can from the tub.

From the above description it will be noted that I have provided a shipping and dispensing appliance for ice cream freezers and shipping tubs which is extremely simple, but which effectively performs the functions for which it is intended.

While I have described the preferred embodiment of my invention, minor details of construction may be resorted to without departing from the spirit or sacrificing any advantages of the invention.

Having thus fully described the invention, what is claimed as new is:

The combination with a tub having oppositely disposed threaded extensions, one of said extensions being hingedly connected with the tub, a closure having a central opening and being provided with ears engaging the extensions of the tub, securing elements upon the extensions, a can having a reduced mouth within the tub, a collar extending through the central opening of the closure to the top of the tub and engaging the reduced mouth of the can, a supporting ring upon the collar, radiating fingers upon the ring and engaging the tub, and a closure for the collar comprising a stationary portion secured to the collar and a door member hingedly connected with the stationary member.

In testimony whereof I affix my signature in presence of two witnesses.

OTIS R. BRIGGS.

Witnesses:
R. G. SALTER,
E. MAUDE BRIGGS.